United States Patent [19]
Faigle

[11] Patent Number: 6,053,530
[45] Date of Patent: Apr. 25, 2000

[54] VEHICLE OCCUPANT PROTECTION APPARATUS

[75] Inventor: Ernst M. Faigle, Dryden, Mich.

[73] Assignee: TRW Vehicle Safety Systems Inc., Lyndhurst, Ohio

[21] Appl. No.: 09/121,511

[22] Filed: Jul. 23, 1998

[51] Int. Cl.[7] .................................................. B60R 21/32
[52] U.S. Cl. ........................................ 280/735; 280/728.3
[58] Field of Search .................................. 280/735, 736, 280/728.3, 732, 731, 751

[56] References Cited

U.S. PATENT DOCUMENTS

| | | | |
|---|---|---|---|
| 4,006,919 | 2/1977 | Neuman | 280/736 |
| 4,964,652 | 10/1990 | Karlow | 280/731 |
| 5,224,733 | 7/1993 | Simsic . | |
| 5,251,659 | 10/1993 | Sturman et al. . | |
| 5,374,821 | 12/1994 | Muhs et al. . | |
| 5,573,269 | 11/1996 | Gentry et al. . | |
| 5,590,903 | 1/1997 | Phillion et al. . | |
| 5,615,910 | 4/1997 | Margetak et al. . | |
| 5,863,066 | 1/1999 | Blumenthal | 280/737 |
| 5,927,753 | 7/1999 | Faigle et al. | 280/735 |
| 5,961,144 | 10/1999 | Desmarais | 280/731 |
| 5,964,478 | 10/1999 | Stanley et al. | 280/735 |

FOREIGN PATENT DOCUMENTS

WO9734785  9/1997  WIPO .

*Primary Examiner*—Paul N. Dickson
*Assistant Examiner*—Lynda Jasmin
*Attorney, Agent, or Firm*—Tarolli, Sundheim, Covell, Tummino & Szabo L.L.P.

[57] ABSTRACT

An apparatus (10) includes an inflatable vehicle occupant protection device (14) which is deployable into engagement with a vehicle occupant. The apparatus (14) further includes a source (16) of inflation fluid and a device (62) that is actuatable to regulate a flow of the inflation fluid from the source (16) to the protection device (14). A cover structure (40) is configured to cover the protection device (14) at a location that is spaced from the occupant when the occupant is not out-of-position. A sensor (50) senses a force (F) applied to the cover structure (40) by the occupant when the occupant is out-of-position. A controller (64) responds to the sensor (50) by controlling the actuatable device (62) with reference to the force (F) applied to the cover structure (40) by the out-of-position occupant.

18 Claims, 2 Drawing Sheets

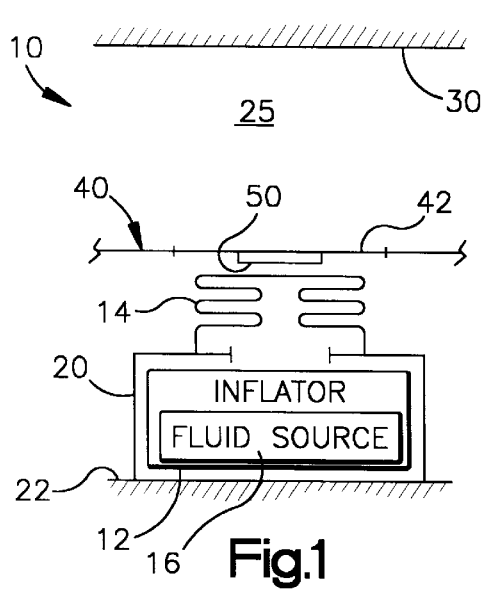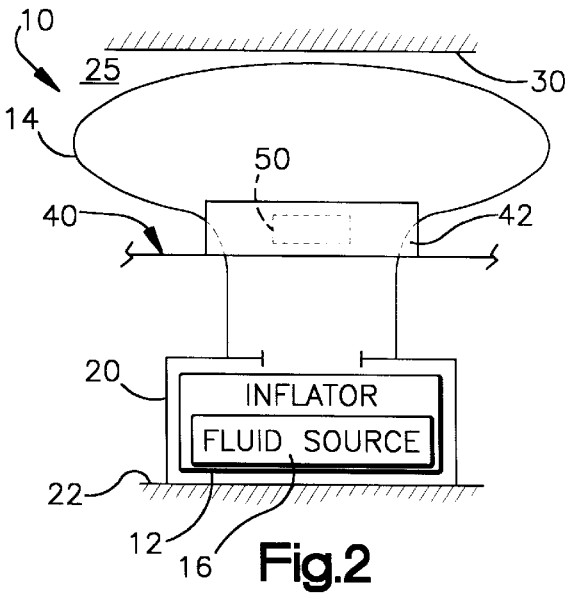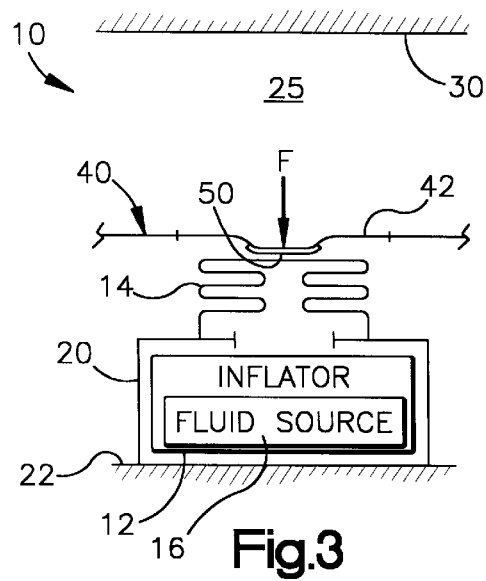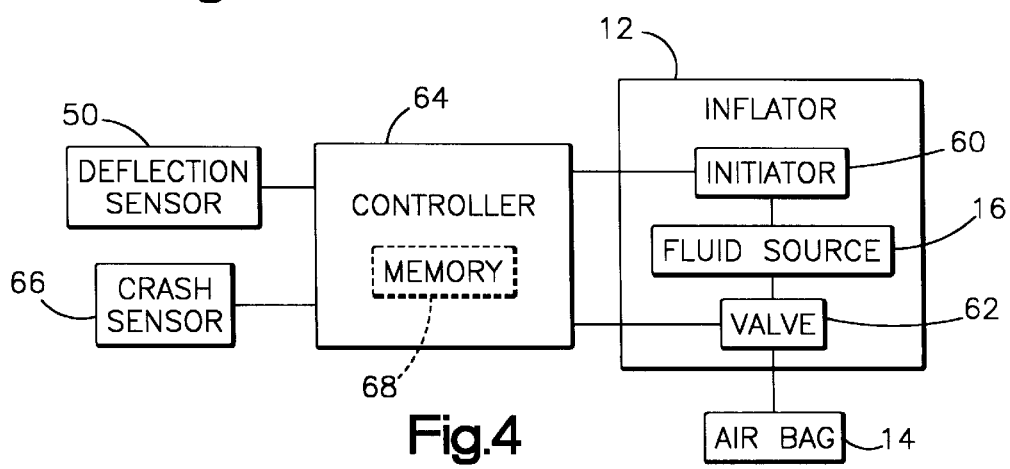

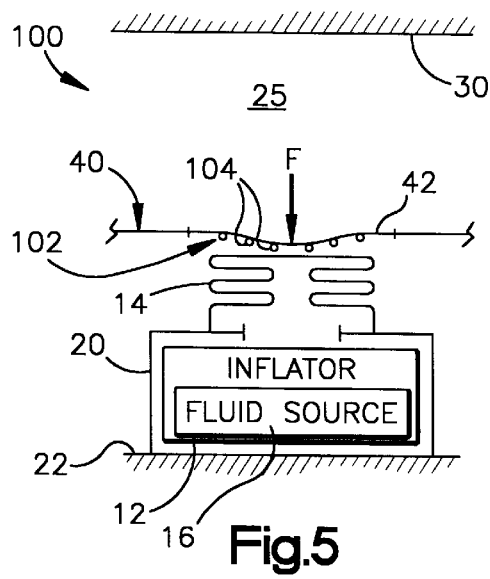
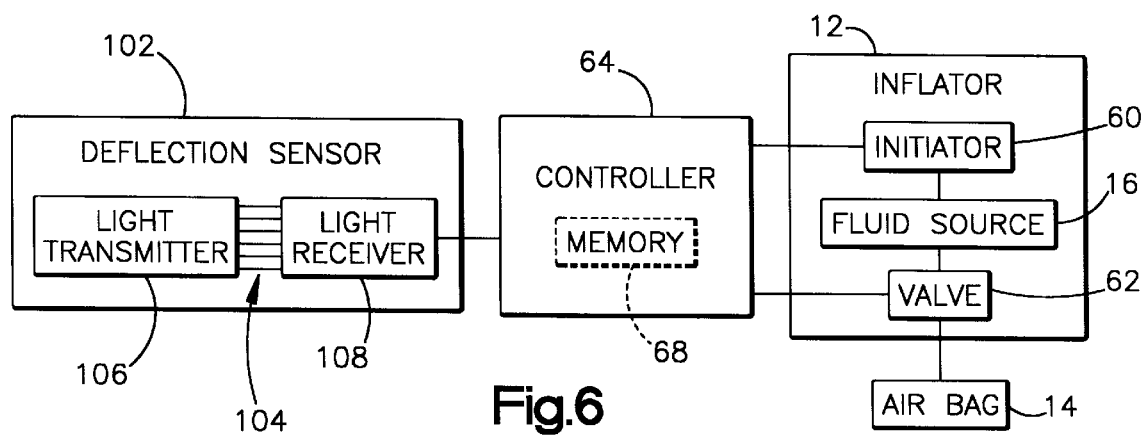

1

VEHICLE OCCUPANT PROTECTION APPARATUS

FIELD OF THE INVENTION

The present invention relates to an apparatus including an inflatable vehicle occupant protection device.

BACKGROUND OF THE INVENTION

An inflatable vehicle occupant protection device, such as an air bag, is inflated to help protect an occupant of a vehicle upon the occurrence of a crash. The air bag is stored in the vehicle in a folded condition at a location adjacent to the vehicle occupant compartment. When the vehicle experiences a crash having at least a predetermined threshold level of severity, an inflator emits inflation fluid which is directed to flow into the air bag. The air bag is then inflated from the folded, stored condition to an unfolded, deployed condition extending into the vehicle occupant compartment. The air bag can then engage an occupant of the vehicle to help restrain movement of the occupant under the influence of vehicle crash forces.

A cover structure conceals the air bag from view in the vehicle occupant compartment. The cover structure may comprise a steering wheel cover for a driver's side air bag. The cover structure may alternatively comprise a trim portion of an instrument panel for covering a passenger side air bag. Other cover structures also are known for covering air bags at other locations in a vehicle. Such cover structures typically have a pivotal deployment door which is opened by the air bag as the air bag inflates into the vehicle occupant compartment.

The manner in which the inflating air bag engages a vehicle occupant is determined in part by the location of the occupant relative to the air bag as the air bag emerges from the cover structure. Accordingly, the manner in which the air bag engages the vehicle occupant is determined in part by the location of the occupant relative to the cover structure at the time of the crash.

SUMMARY OF THE INVENTION

In accordance with the present invention, an apparatus comprises an inflatable vehicle occupant protection device which is deployable into engagement with a vehicle occupant. The apparatus further comprises a source of inflation fluid and a device that is actuatable to regulate a flow of the inflation fluid from the source to the protection device. A cover structure is configured to cover the protection device at a location that is spaced from the occupant when the occupant is not out-of-position. A sensor senses a force applied to the cover structure by the occupant when the occupant is out-of-position. A controller responds to the sensor by actuating the actuatable device with reference to the force applied to the cover structure by the out-of-position occupant.

BRIEF DESCRIPTION OF THE DRAWINGS

The foregoing and other features of the present invention will becomes apparent to one skilled in the art to which the present invention relates upon reading the following description of the invention with reference to the accompanying drawings, wherein:

FIG. 1 is a schematic view of a vehicle occupant protection apparatus comprising a first embodiment of the present invention;

FIG. 2 is a view similar to FIG. 1 showing the apparatus in an actuated condition;

FIG. 3 is a view similar to FIG. 1 showing parts in different positions;

FIG. 4 is a block diagram of parts of the apparatus of FIG. 1;

FIG. 5 is a schematic view of parts of an apparatus comprising a second embodiment of the present invention; and FIG. 6 is a block diagram of parts of the apparatus of FIG. 5.

DESCRIPTION OF PREFERRED EMBODIMENTS

A vehicle occupant protection apparatus 10 comprising a first embodiment of the present invention is shown partially in the schematic views of FIGS. 1 and 2. The apparatus 10 includes an inflator 12 and a particular type of inflatable vehicle occupant protection device 14 which is known as an air bag. The inflator 12 is actuatable to inflate the air bag 14 from a folded, stored condition, as shown schematically in FIG. 1, to an unfolded, deployed condition, as shown schematically in FIG. 2.

The air bag 14 is constructed of one or more panels of a known air bag material. Such materials include woven materials and plastic films. The panels of air bag material are interconnected along seams that are formed by stitches, ultrasonic welds, adhesives, heat staking, or the like, depending on the particular air bag material of which the panels are formed. Preferably, the air bag 14 is constructed of panels formed of a nylon fabric which is coated with silicone. Other inflatable vehicle occupant protection devices that can be used in accordance with the invention include, for example, inflatable seat belts, inflatable knee bolsters, inflatable headliners or side curtains, and knee bolsters operated by inflatable air bags.

The inflator 12 contains a source 16 of inflation fluid for inflating the air bag 14. As known in the art, the source 16 of inflation fluid may comprise pressurized inflation fluid, a body of ignitable gas generating material, or a combination of pressurized inflation fluid and ignitable material for heating the inflation fluid.

The air bag 14 and the inflator 12 are mounted on a supporting structure 20 which, in turn, is mounted on a part 22 of the vehicle adjacent to the vehicle occupant compartment 25. The supporting structure 20 could be a reaction plate, a reaction canister, a manifold, or the like. Accordingly, the part 22 of the vehicle on which the supporting structure 20 is mounted could be the steering wheel or steering column, the instrument panel, a door panel, or the like. In the first embodiment of the present invention, that part 22 of the vehicle is the instrument panel. The air bag 14 is thus located opposite a front seat 30 in the vehicle occupant compartment 25. When the air bag 14 is inflated, it is deployed from the instrument panel 22 toward an occupant of the seat 30 to help restrain movement of the occupant in the opposite direction toward the instrument panel 22.

A cover structure 40 covers the air bag 14 to conceal the air bag 14 from view in the vehicle occupant compartment 25. In the first embodiment of the present invention, the cover structure 40 is a flexible plastic trim panel which is configured to define the contour of the instrument panel 22 across the location of the air bag 14. The trim panel 40 includes a pivotal deployment door 42 which is opened by the inflating air bag 14.

As shown schematically in FIG. 3, the trim panel 40 is deflectable under a force F applied by an occupant of the seat 30. Such deflection may occur when an occupant of the seat 30 leans forward against the trim panel 40. Deflection of the trim panel 40 then indicates that the occupant is out-of-position. The amount of deflection indicates the magnitude of the force F, and thus indicates the degree to which the occupant is out-of-position.

The apparatus 10 further includes a deflection sensor 50 that senses deflection of the trim panel 40. The deflection sensor 50, which also is shown schematically in FIGS. 1–3, preferably comprises a strain gauge or an array of strain gauges on the deployment door 42. Such deflection sensing devices can be operatively interconnected and mounted on the trim panel 40 in any suitable manner known in the art.

As shown in the block diagram of FIG. 4, the inflator 12 includes an initiator 60. In the first embodiment of the invention, the inflator 14 further includes a valve 62. The initiator 60 functions to initiate an outlet flow of inflation fluid from the source 16 to the air bag 14. The valve 62 functions to regulate the outlet flow of inflation fluid. Each of these devices 60 and 62 may comprise any suitable structure known in the art. For example, the initiator 60 and the valve 62 may be constructed substantially as shown in International Patent Application WO97/34785 entitled "Air Bag System Inflator." The valve 62 may alternatively comprise a fast acting solenoid valve like the valve described in U.S. patent application Ser. No. 08/990,590, filed Dec. 15, 1997, entitled "Vehicle Occupant Protection Apparatus." U.S. Pat. No. 5,251,659 also shows a fast acting solenoid valve that can be used in accordance with the present invention.

Other parts shown in FIG. 4 include a controller 64 and a crash sensor 66. The crash sensor 66 is a known device that senses one or more vehicle conditions indicating the occurrence of a crash. If a crash-indicating condition sensed by the crash sensor 66 is at or above a predetermined threshold level, it indicates the occurrence of a crash having at least a predetermined threshold level of severity. The threshold level of crash severity is a level at which deployment of the air bag 14 is desired to help protect an occupant of the seat 30 (FIGS. 1–3). The crash sensor 66 then provides the controller 64 with a deployment signal. The controller 64, which may comprise a known microprocessor, responds to the deployment signal by actuating the initiator 60 to initiate the outlet flow of inflation fluid from the source 16 to the air bag 14.

The controller 64 further functions to actuate the valve 62 in response to a deflection signal provided by the deflection sensor 50. Specifically, the controller 64 has a memory location 68. The memory location 68 stores data comprising a plurality of predetermined modes of actuation for the valve 62. The deflection signal provided by the deflection sensor 50 may indicate that a vehicle occupant is applying a force to the trim panel 40, as indicated in FIG. 3, and may thus indicate that the occupant is out-of-position. If so, the controller 64 will select a mode of actuation in which the valve 62 regulates the outlet flow of inflation fluid from the inflator 12 to the air bag 14 so as to provide a predetermined "soft" mode of inflation for the air bag 14. The mode of actuation selected for the valve 62, and hence the soft mode of inflation provided for the air bag 14, corresponds to the amount of deflection sensed by the sensor 50. The air bag 14 is thus inflated in accordance with the degree to which the vehicle occupant is out-of-position.

If the deflection sensor 50 senses that deflection of the trim panel 40 exceeds a maximum acceptable amount, the controller 64 will preferably respond by preventing actuation of the initiator 60 in response to the deployment signal received from the crash sensor 66. This will prevent the air bag 14 from inflating into engagement with the out-of-position occupant. If the vehicle occupant does not apply a force to the trim panel 40 in the manner indicated in FIG. 3, the deflection sensor 50 will not sense any deflection of the trim panel 40. The controller 64 may then select a mode of actuation for the valve 62 that is suitable for an occupant who is not out-of-position.

An apparatus 100 comprising a second embodiment of the invention is shown in FIGS. 5 and 6. The apparatus 100 has many parts that are substantially the same as corresponding parts of the apparatus 10 described above. This is indicated by the use of the same reference numbers for such corresponding parts in FIGS. 5–6 and 1–4. However, the apparatus 100 includes an alternative deflection sensor 102 in place of the deflection sensor 50 in the first embodiment.

The alternative deflection sensor 102 comprises an array of optical fibers 104 which are mounted on the deployment door 42 to deflect with the deployment door 42 under a force F applied by a vehicle occupant. The transmittancy of the optical fibers 104 varies when they deflect in this manner. Accordingly, a variation in the transmittancy of the optical fibers 104 indicates that an occupant of the seat 30 is out-of-position, with the amount of such variation indicating the degree to which the occupant is out-of-position.

As shown in FIG. 6, the deflection sensor 102 in the second embodiment further includes a light transmitter 106 and a light receiver 108. The optical fibers 104 can be operatively interconnected with the transmitter 106 and the receiver 108 in any suitable manner known in the art. In this arrangement, the transmittancy of the optical fibers 104 is indicated by an output signal that the receiver 108 provides to the controller 64. The controller 64 in the second embodiment responds to the output signal provided by the receiver 108 in the same manner that the controller 64 in the first embodiment responds to the deflection signal provided by the deflection sensor 50.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

an inflatable vehicle occupant protection device deployable into engagement with a vehicle occupant;

a source of inflation fluid;

a device that is actuatable to regulate a flow of said inflation fluid from said source to said protection device;

a cover structure configured to cover said protection device at a location that is spaced from said occupant when said occupant is not out-of-position;

a sensor that senses a force applied to said cover structure by said occupant when said occupant is out-of-position; and a controller that responds to said sensor by controlling actuation of said actuatable device with reference to said force.

2. Apparatus as defined in claim 1 wherein said controller controls actuation of said actuatable device in a selected one of a plurality of differing modes corresponding to a plurality of differing forces that may be applied to said cover structure by an out-of-position vehicle occupant.

3. Apparatus as defined in claim 1 wherein said actuatable device is part of an inflator containing said source of inflation fluid.

4. Apparatus as defined in claim 3 wherein said actuatable device is a valve.

5. Apparatus as defined in claim 1 wherein said cover structure comprises a trim panel configured to define the contour of a vehicle instrument panel across the location of said protection device.

6. Apparatus as defined in claim 1 wherein said sensor senses deflection of said cover structure under said force.

7. Apparatus as defined in claim 6 wherein said sensor comprises a strain gauge.

8. Apparatus as defined in claim 6 wherein said sensor comprises an optical fiber mounted to deflect with said cover structure.

9. Apparatus comprising:

an inflatable vehicle occupant protection device deployable into engagement with a vehicle occupant;

an inflator which is actuatable to inflate said protection device;

a cover structure configured to cover said protection device at a location that is spaced from said occupant when said occupant is not out-of-position;

a sensor that senses a force applied to said cover structure by said occupant when said occupant is out-of-position; and a controller that responds to said sensor by controlling actuation of said inflator with reference to said force.

10. Apparatus as defined in claim 9 wherein said controller controls actuation of said inflator in a first mode when said sensor senses said force and in a second, different mode when said sensor does not sense said force.

11. Apparatus as defined in claim 10 wherein said inflator does not inflate said protection device when actuation of said inflator is controlled in said second mode.

12. Apparatus as defined in claim 10 wherein said first mode is one of a plurality of differing modes corresponding to a plurality of differing forces that may be applied to said cover structure by an out-of-position vehicle occupant.

13. Apparatus as defined in claim 9 wherein said cover structure comprises a trim panel configured to continue the contour of a vehicle instrument panel across the location of said protection device.

14. Apparatus as defined in claim 9 wherein said sensor senses deflection of said cover structure under the influence of said force.

15. Apparatus as defined in claim 14 wherein said sensor comprises a strain gauge.

16. Apparatus as defined in claim 14 wherein said sensor comprises an optical fiber mounted to deflect with said cover structure.

17. Apparatus comprising:

an inflatable vehicle occupant protection device deployable into engagement with a vehicle occupant;

means for inflating said protection device;

means for covering said protection device at a location that is spaced from said occupant when said occupant is not out-of-position;

means for sensing a force applied to said covering means by said occupant when said occupant is out-of-position; and means for responding to said sensing means by actuating said inflating means in a selected one of a plurality of differing modes corresponding to a plurality of differing forces that may be applied to said covering means by an out-of-position vehicle occupant.

18. Apparatus as defined in claim 17 wherein said modes include a mode in which said inflating means does not inflate said protection device.

* * * * *